United States Patent
Konik et al.

(10) Patent No.: US 9,298,775 B2
(45) Date of Patent: Mar. 29, 2016

(54) CHANGING THE COMPRESSION LEVEL OF QUERY PLANS

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/604,737

(22) Filed: Jan. 25, 2015

(65) Prior Publication Data

US 2015/0142762 A1  May 21, 2015

Related U.S. Application Data

(63) Continuation of application No. 13/469,317, filed on May 11, 2012, now Pat. No. 8,949,222.

(51) Int. Cl.
*G06F 7/02* (2006.01)
*G06F 17/30* (2006.01)

(52) U.S. Cl.
CPC ...... *G06F 17/30501* (2013.01); *G06F 17/3048* (2013.01); *G06F 17/30289* (2013.01); *G06F 17/30463* (2013.01); *G06F 17/30483* (2013.01)

(58) Field of Classification Search
CPC .......... G06F 17/30463; G06F 17/3048; G06F 17/30289; G06F 17/30
See application file for complete search history.

(56) References Cited

U.S. PATENT DOCUMENTS

| | | | |
|---|---|---|---|
| 2008/0082812 A1 | 4/2008 | Kirshenbaum et al. | |
| 2011/0131199 A1 | 6/2011 | Simon et al. | |
| 2011/0208703 A1 | 8/2011 | Fisher et al. | |
| 2012/0054162 A1* | 3/2012 | Ziv | G06F 9/4443 707/693 |
| 2012/0265972 A1* | 10/2012 | Zwartenkot | G06F 8/4434 712/226 |
| 2013/0283230 A1 | 10/2013 | Klein | |

OTHER PUBLICATIONS

Ferreira, Miguel C., "Compression and Query Execution within Column Oriented Databases", Massachusetts Institute of Technology, Department of Electrical Engineering and Computer Science (Master's Thesis), Jun. 2005.

* cited by examiner

*Primary Examiner* — Bruce Moser
(74) *Attorney, Agent, or Firm* — Owen J. Gamon; Roy W. Truelson

(57) ABSTRACT

In an embodiment, a query plan is compressed to data in a cache at a high compression level if a runtime of a query that the query plan implements is greater than a high time threshold. The query plan is compressed to the data in the cache at a medium compression level if the runtime of the query that the query plan implements is less than the high time threshold and greater than a low time threshold. The query plan is stored to the data in the cache at an uncompressed level if the runtime of the query that the query plan implements is less than the low time threshold.

7 Claims, 8 Drawing Sheets

CHARACTERIZATION DATA — 380

| QUERY PLAN ID | QUERY FREQUENCY | QUERY RUNTIME | |
|---|---|---|---|
| QP A | 1/HOUR | 5 SEC | 402 |
| QP B | 2/DAY | 10 MIN | 404 |
| QP C | 3/DAY | 1 HOUR | 406 |

| CPU UTIL | CACHE SIZE | CACHE UTIL | MEMORY UTIL | CONCURRENCY LEVEL |
|---|---|---|---|---|
| 50% | 1 GB | 65% | 75% | 3 THREADS |

FIG. 4

CHANGING THE COMPRESSION LEVEL OF QUERY PLANS

CROSS REFERENCE TO RELATED APPLICATIONS

This is a continuation of pending U.S. patent application Ser. No. 13/469,317, filed May 11, 2012, entitled "Changing the Compression Level of Query Plans", which is herein incorporated by reference. This application claims priority under 35 U.S.C. §120 of U.S. patent application Ser. No. 13/469,317. This application is also related to commonly assigned U.S. patent application Ser. No. 14/604,736, filed the same date as the present application, entitled "Changing the Compression Level of Query Plans".

FIELD

An embodiment of the invention generally relates to database management systems that process queries with query plans and more particularly to changing the compression level of query plans.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database, which organizes data in tables that have rows, which represent individual entries, tuples, or records in the database, and columns, fields, or attributes, which define what is stored in each entry, tuple, or record. Each table has a unique name within the database and each column has a unique name within the particular table. The database also has one or more indexes, which are data structures that inform the DBMS of the location of a certain row in a table given an indexed column value, analogous to a book index informing the reader of the page on which a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as a query plan (QP), a query execution plan (QEP), a query access plan (QAP), or an access plan (AP). The DBMS often saves the query plan and reuses it when the user or requesting program repeats the query, which is a common occurrence, instead of undergoing the time-consuming process of recreating the query plan.

SUMMARY

A method, computer-readable storage medium, and computer system are provided. In an embodiment, a query plan is compressed to data in a cache at a high compression level if a runtime of a query that the query plan implements is greater than a high time threshold. The query plan is compressed to the data in the cache at a medium compression level if the runtime of the query that the query plan implements is less than the high time threshold and greater than a low time threshold. The high time threshold is greater than the low time threshold, and the high compression level is greater than the medium compression level. The query plan is stored to the data in the cache at an uncompressed level if the runtime of the query that the query plan implements is less than the low time threshold.

BRIEF DESCRIPTION OF THE SEVERAL VIEWS OF THE DRAWINGS

FIG. 4 depicts a block diagram of an example data structure for characterization data, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
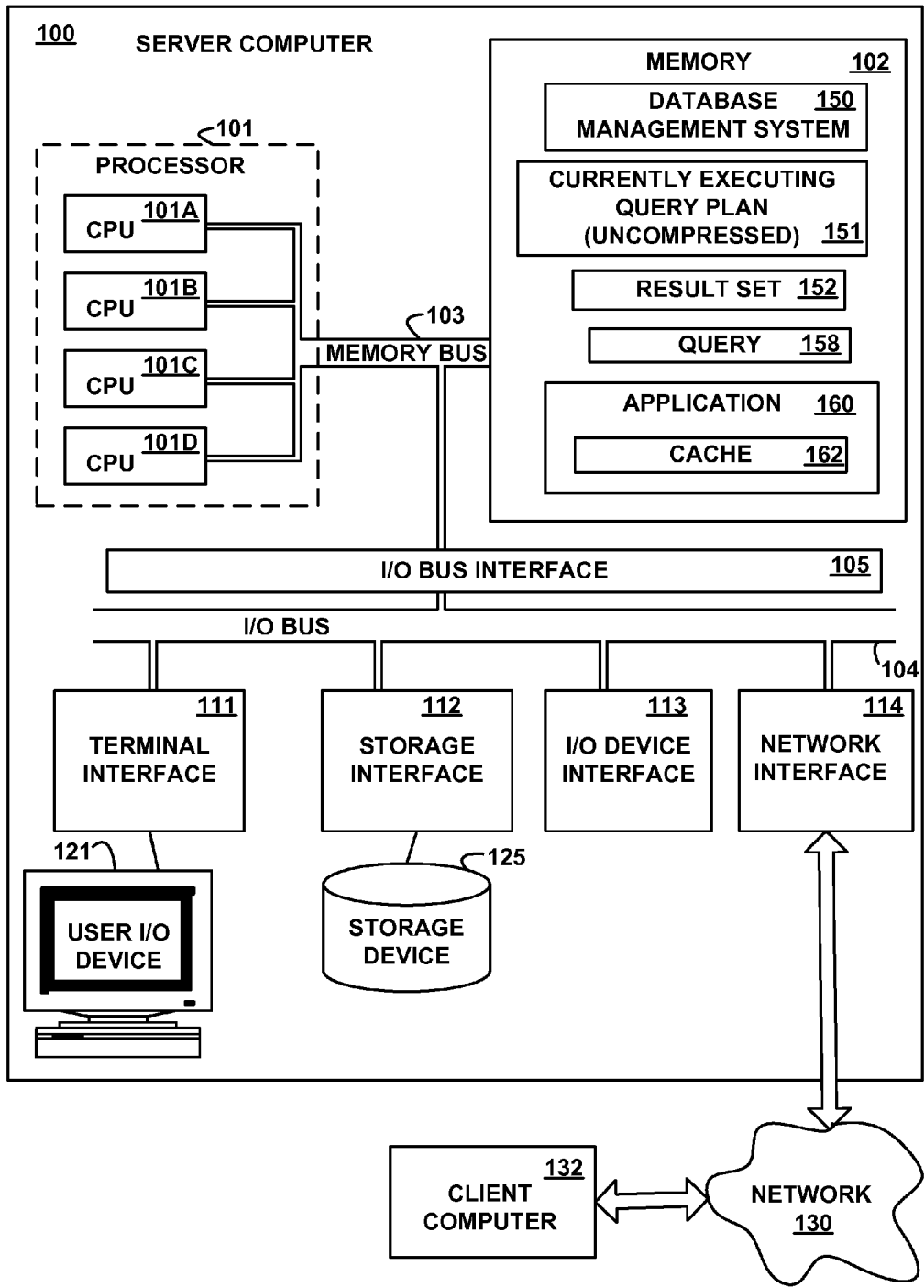
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a memory 102, a terminal interface 111, a storage interface 112, an I/O (Input/Output)

device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a database management system (DBMS) 150, a currently executing query plan 151, which is at an uncompressed level, a result set 152, a query 158, and an application 160. Although the database management system 150, the currently executing query plan 151, the result set 152, the query 158, and the application 160 are illustrated as being contained within the memory 102 in the computer system 100, in other embodiments some or all of them may be on different computer systems and may be accessed remotely, e.g., via the network 130. For example, the database management system 150, the currently executing query plan 151, the result set 152, the query 158, and the application 160 may be stored in memory in the client computer 132. The computer system 100 may use virtual addressing mechanisms that allow the programs of the computer system 100 to behave as if they only have access to a large, single storage entity instead of access to multiple, smaller storage entities. Thus, while the database management system 150, the currently executing query plan 151, the result set 152, the query 158, and the application 160 are illustrated as being contained within the memory 102, these elements are not necessarily all completely contained in the same storage device at the same time. Further, although the database management system 150, the currently executing query plan 151, the result set 152, the query 158, and the application 160 are illustrated as being separate entities, in other embodiments some of them, portions of some of them, or all of them may be packaged together.

In an embodiment, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, 4, 5, 6, 7, and 8. In another embodiment, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the DBMS 150 and/or the application 160 comprise data in addition to instructions or statements. For example, the application 160, in an embodiment, comprises a cache 162. In various embodiments, each application 160 has its own cache within the respective application 160, each application 160 has its own cache outside the respective application 160, or the applications 160 share the same cache. The cache 162 may be scoped system wide, application wide, schema wide, or to a thread, or any other scoping criteria. In various embodiments, the application 160 is a user application, a third-party application, an operating system, or any portion, multiple, or combination thereof. Although the cache 162 is illustrated as being contained in the application 160, in other embodiments, the cache 162 may be in the DBMS 150, in an SQL (Structured Query Language) package, or in a program object. Although the cache 162 is illustrated as being located on the same computer system 100 as the DBMS 150, in other embodiments, the cache 162 may be remote from the DBMS 150, in a different virtual machine from the DBMS 150, or stored on a different computer from the DBMS 150, and accessed, e.g. via the network 130.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100. In an embodiment, the application 160 may be stored in a storage device at the client computer 132, may execute on a processor at the client computer 132, and may send queries 158 to and receive result sets 152 from the computer 100 via the network 130.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. 12The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
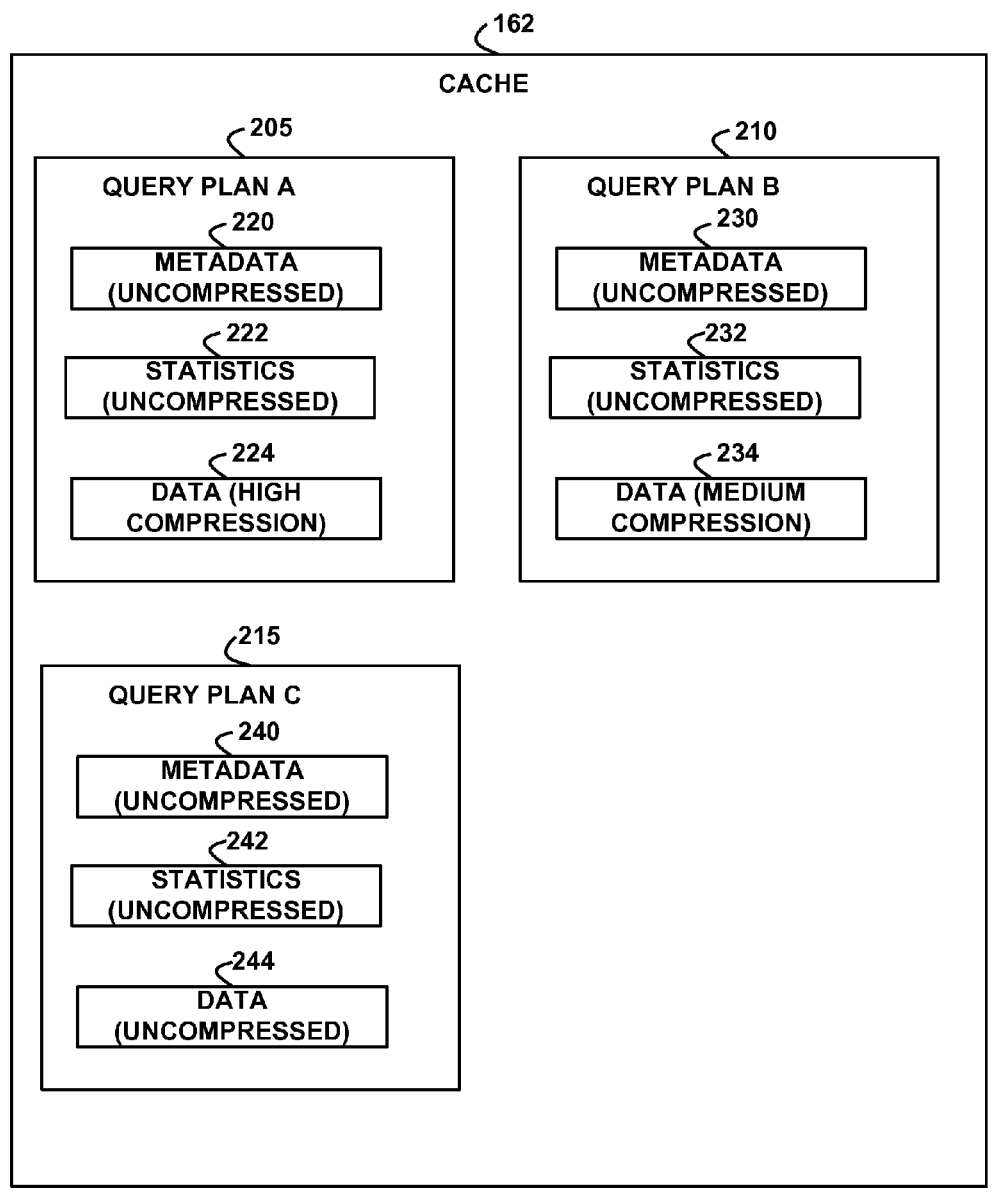
FIG. 2 depicts a block diagram of a cache, according to an embodiment of the invention.

FIG. 2 depicts a block diagram of a cache 162, according to an embodiment of the invention. The cache 162 comprises any number of query plans, such as the query plan A 205, the query plan B 210, and the query plan C 215. The query plan A 205 comprises metadata 220, statistics 222, and data 224. The query plan B comprises metadata 230, statistics 232, and data 234. The query plan C 215 comprises metadata 240, statistics 242, and data 244. The metadata 220, the metadata 230, the metadata 240, the statistics 222, the statistics 222, and the statistics 242 are at an uncompressed level. The data may be either compressed or uncompressed and if compressed may be compressed at various compression levels. For example, the data 224 is compressed at a high compression level, the data 234 is compressed at a medium compression level, and the data 244 is at an uncompressed level.

The compression level is the degree to which the data is compressed, such that data that is uncompressed has a larger size (uses a larger amount of storage) than does the same data that is compressed at a medium compression level, which uses a larger amount of storage than does the same data that is compressed at a high compression level. In an embodiment, compressing data to a high compression level takes more time or consumes more processing power than does compressing the same data to a medium compression level, which takes more time or consumes more processing power than merely storing the data in an uncompressed level. Although FIG. 2 illustrates uncompressed data, a medium compression level, and a high compression level, any number of levels or degrees of compression may be used, and the compression levels may be identified by any appropriate names or identifiers.

Data compression involves encoding information using fewer bits than the original or uncompressed representation of the data. In an embodiment, the DBMS 150 implements lossless compression, which reduces the number of bits by identifying and eliminating statistical redundancy, so that no information is lost by the compression, and data that is compressed and then uncompressed is identical to the original data that was never compressed. In various embodiments, the DBMS 150 may implement data compression via the Lempel-Ziv (LZ) compression algorithm, the DEFLATE algorithm, the LZR (LZ-Renau) algorithm, or any other appropriate compression algorithm.

The query plan data 224, 234, and 244 specify the respective internal steps that the DBMS 150 takes, in order to create the result set 152 that satisfies or meets the criteria specified by the query 158. These internal steps may comprise an identification of the table or tables specified in the query 158, the values in the row or rows to be selected by the query 158, and other information such as whether to use an existing index, whether to build a temporary index, whether to scan each table (read the table in storage address order) or use an index to randomly access the table, whether to use a temporary file to execute a sort or hash, and/or the order in which the tables are to be joined together to satisfy the query 158, or any other appropriate technique. In an embodiment, the query plan data 224, 234, and 244 are depicted as tree graphs with nodes that identify tables used by the query and connections between the nodes that identify the join order of the rows returned from the tables.

In response to a query 158 that requests data from multiple tables, the DBMS 150 joins tuples from these multiple tables (the tuples are often concatenated horizontally in the result set 152) in a join order, so as to find and retrieve the data from all the tables. Thus, a join operation is a relationship between two tables accessed by a query (a join query), and the DBMS 150 performs a join operation to connect (or join) data from two or more tables, wherein the DBMS 150 joins together the tuples with matching attributes, in order to form a new tuple. The join order is the order in which the DBMS 150 performs the join operations while executing the query 158 via executing the query plan data 224, 234, and 244, in order to retrieve and join rows of data from the database tables into the result set 152.

Join operations are typically implemented using a nested loop algorithm, where the DBMS 150 joins resultant new tuples from the first two tables in the join order to the resultant tuples from the third table, and then the DBMS 150 joins those results to the fourth table, etc. Eventually all of the needed join operations are complete, and the resultant new tuples are the result set 152, which satisfies or meets the criteria specified by the query 158. In other embodiments, join operations may be implemented via any appropriate technique.

Because a single join is limited to accessing two tables, the DBMS 150 may perform multi-table joins in sequence, according to a particular order. The DBMS 150 may, e.g., implement many different join queries in multiple query plans by joining the tables in any of several possible join orders, all of which implement the same query. For example, a query that involves joining tables A, B, and C can often be performed as a join of table A and B followed by a join of table A and C. Alternatively, in many instances, the same query can be performed as a join of table A and C followed by the join of table A and B. The DBMS 150 attempts to select a join order that eliminates the greatest number of records from the potential result set early in the join processing, which saves the costs associated with repeatedly accessing tables later in the join operation.

The metadata 220, the metadata 230, and the metadata 240 specify selection criteria that the DBMS 150 uses to select the query plan that implements a particular query from among multiple query plans that all implement the same query, and the statistics 222, 232, and 242 comprise data that characterize the last execution of their respective query plan. For example, the metadata 230 may include a copy of the query 158 that the query plan implements and an identifier of an index used by the query plan. In response to receiving a query 158, the DBMS 150 searches the metadata in the various query plans in the cache 162 for metadata that specifies a query that is identical to the received query 158. If multiple query plans are found with metadata that specify queries that are identical to the received query 158, then the DBMS 150 may estimate the number of rows that the index in the database specified by the metadata returns, when executed, and compare the estimated number of rows to the statistics in the same query plan. The statistics, in this example, identify the actual number of rows that the index returned the most recent time that the query plan was executed. The DBMS 150 then selects the query plan whose statistics most closely match the estimate.

Figure 3:
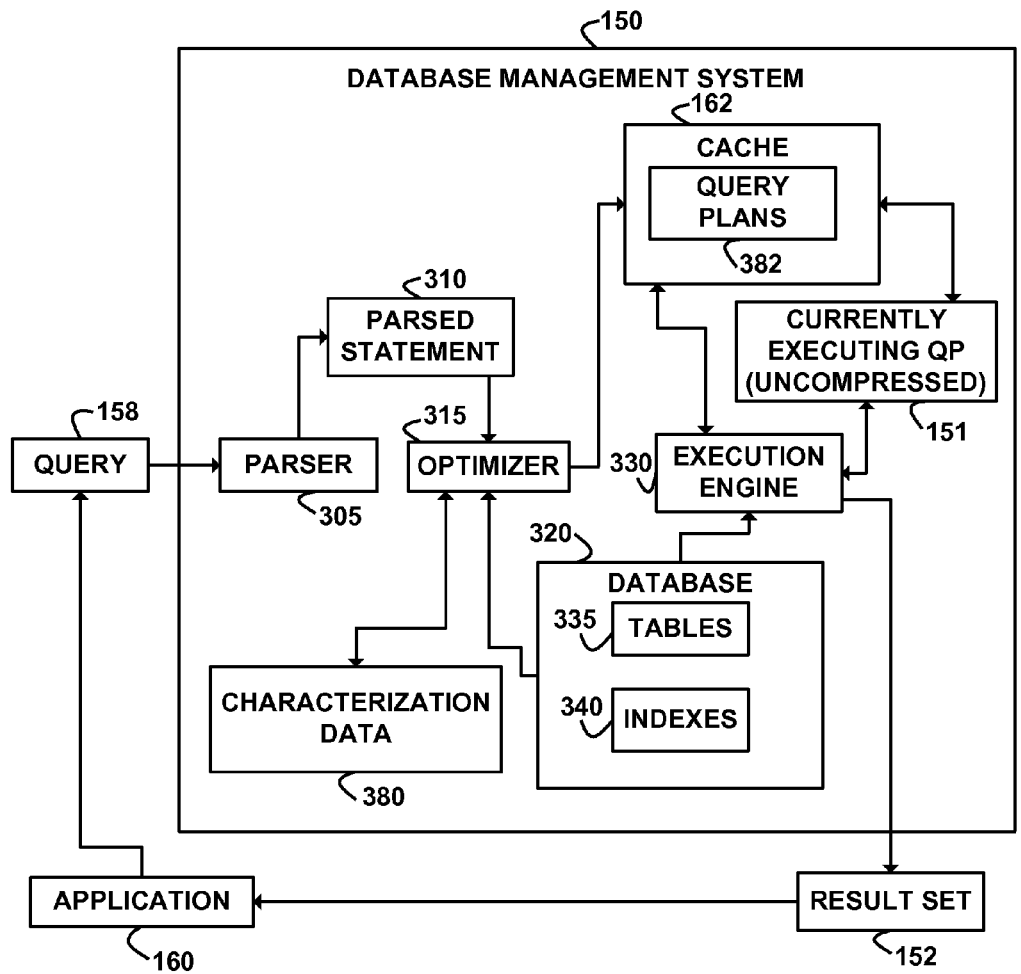
FIG. 3 depicts a block diagram of an example database management system, according to an embodiment of the invention.

FIG. 3 depicts a block diagram of an example database management system 150, according to an embodiment of the invention. The DBMS 150 comprises a parser 305, a parsed statement 310, an optimizer 315, a database 320, a cache 162 comprising query plans 382, an execution engine 330, characterization data 380, and a currently executing query plan (QP) (uncompressed) 151. The query plans 382 are examples of, and generically refer to, the query plans 205, 210, and 215. The database 320 comprises tables 335 and one or more indexes 340. The tables 335 organize data in rows, which represent individual entries, tuples, or records and columns, fields, or attributes, which define what is stored in each row, entry, tuple, or record. Each table 335 has a unique name within the database 320 and each column has a unique name within the particular table 335. The indexes 340 are data structures that inform the DBMS 150 of the location of a certain row in a table 335, in response to the indexes 340 receiving an indexed column value. In other embodiments, the characterization data 380 may be part of the cache 162 or part of metadata 220 (FIG. 2)

The parser 305 in the DBMS 150 receives the query 158 from the application 160. The query 158 requests that the DBMS 150 search for or find a row or combination of rows of data and store the data from those found rows into the result set 152 that meet or satisfy the criteria, keys, and or values specified by the query 158. In an embodiment, the application 160 sends the same query 158 multiple times to the DBMS 150, which may or may not result in a different result set 152, depending on whether the data in the DBMS 150 has changed between occurrences of the query 158 or whether different values are passed into the query 158 via parameter markers or host variables. In an embodiment, the application 160 sends different queries 158 to the DBMS 150. The parser 305 generates a parsed statement 310 from the query 158, which the parser 305 sends to the optimizer 315. The optimizer 315 performs query optimization on the parsed statement 310, using the characterization data 380. As a result of query optimization, the optimizer 315 generates one or more query plans 382, using data such as resource availability, platform capabilities, query content information, etc., that is stored in the database 320. Once generated, the optimizer 315 stores the query plans 382 in the cache 162 in compressed or uncompressed form. The execution engine 330 reads the query plans 382 from the cache 162 and decompresses them into the currently executing (uncompressed) query plan 151. The execution engine 330 then executes the query 158 using the currently executing query plan 151 and the indexes 340, in order to find and retrieve the data in the database tables 335 in the database 320 that satisfies the criteria of the query 158. The execution engine 330 stores the resultant data that satisfies the criteria specified by the query 158 into the result set 152, which the DBMS 150 returns to the application 160, as a response to the query 158. In an embodiment, the DBMS 150 stores various thresholds into the query plans 382. The DBMS 150 may receive the various thresholds from the application 160, from a user, or from a database administrator, or the thresholds may be set by a designer of the optimizer 315.

FIG. 4 depicts a block diagram of an example data structure for characterization data 380, according to an embodiment of the invention. The characterization data 380 characterizes or describes the execution of the query plans 382. The characterization data 380 comprises example entries 402, 404, and 406, each of which comprises a query plan identifier (ID) field 410, a query frequency field 412, and a query runtime field 414. The query plan identifier (ID) field 410, in each entry, uniquely identifies a query plan 382 whose execution is characterized by the entry. The query frequency field 412, in each entry, specifies the average frequency or rate at which that the query plan, identified by the query plan identifier field 410 in the same entry, is executed or the rate at which the DBMS 150 receives the query (that the query plan implements) from the application 160. The query runtime field 414 specifies the execution time of the query plan, identified by the query plan identifier field 410 in the same entry. In various embodiments, the execution time may be the average execution time over a period of time, the most recent execution time, or an estimated execution time. In embodiment, the DBMS 150 measures the query runtime 414 as the duration between the starting time at which the DBMS 150 receives the query from the application 160 and the ending time at which the DBMS 150 sends the result set 152 that satisfies the query 158 to the application 160. For example, the entry 402 specifies that the query plan QP A was executed for five seconds once per hour, the entry 404 specifies that the query plan QP B was executed for ten minutes twice per day, and the entry 406 specifies that the query plan QP C was executed for one hour three times per day.

The characterization data 380 further comprises an example processor or CPU utilization (util) field 440, a cache size field 442, a cache utilization field 444, a memory utilization field 446, and a concurrency level field 448. The CPU utilization field 440 specifies the current utilization of the processor 101 by all threads, processes, or programs that execute via the processor 101 or the average utilization of the processor 101 over a most recent period of time, or the current or average utilization of the processors 101 that execute the query plans, in units of the percentage of the processing power or processing cycles of the processor 101 that are in use. The cache size field 442 specifies the size or amount of the memory 102 that is currently allocated to the cache 162. The cache utilization field 444 specifies the percentage or amount of the cache 162 that is currently in use, not free, or currently allocated to query plans. The memory utilization field 446 specifies the percentage or amount of the memory 102 that is not free or currently allocated to data and programs, such as the DBMS 150, the currently executing query plan 151, the result set 152, the query 158, and the application 160. The concurrency level field 448 specifies the number of threads, processes, or tasks that are concurrently or simultaneously executing on the same or different processors 101 via multi-processing, multi-programming, or time-slicing techniques, in order to execute the query plans.

Figure 5:
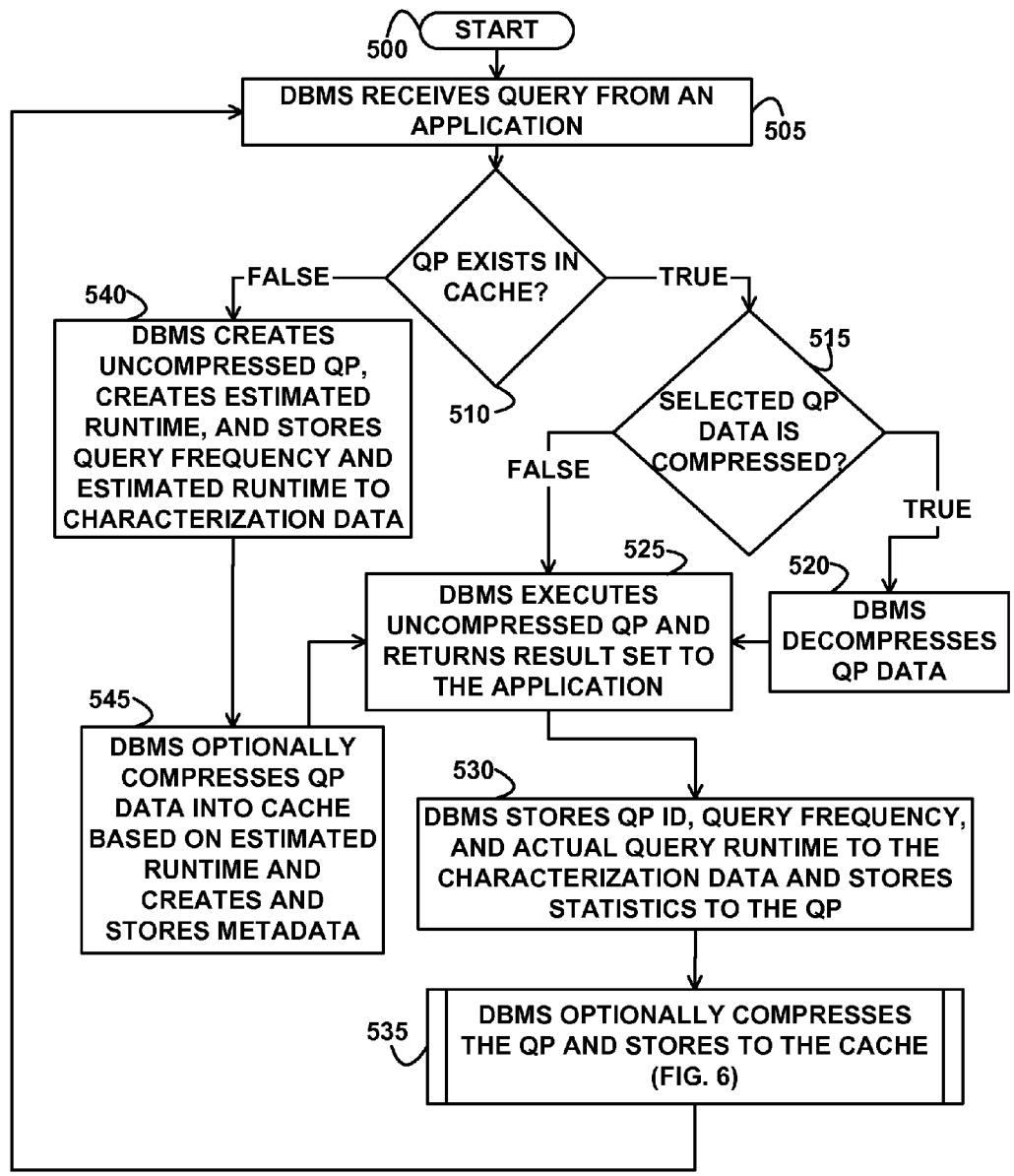
FIG. 5 depicts a flowchart of example processing for queries, according to an embodiment of the invention.

FIG. 5 depicts a flowchart of example processing for queries, according to an embodiment of the invention. Control begins at block 500. Control then continues to block 505 where the DBMS 150 receives a query 158 from an application 160. Control then continues to block 510 where the DBMS 150 determines whether a query plan (QP) exists in the cache 162 that implements the query 158. The DBMS 150 determines whether a query plan exists by comparing the query specified by the metadata 220, 230, 240 in each query plan to the received query 158 and determining whether they are identical. If multiple query plans exist in the cache 162 that implement the query 158, the DBMS 150 selects a query plan using the metadata 220, 230, 240 and the statistics 222, 232, 242 in the query plans. For example, the DBMS 150 searches the metadata 220, 230, 240 in the query plans in the cache 162 to determine if at least one query plan exists in the cache 162 that implements the query 158. If more than one query plan exists that implements the query 158, then the DBMS 150 selects one query plan that has metadata 220, 230, 240 and/or statistics 222, 232, 242 that best matches a criteria specified by the received query 158. For example, the DBMS 150 estimates the number of rows that an index 340 (specified by the query 158 and the metadata 220, 230, 240) will return and compares the estimated number of rows to the statistics 222, 232, 242, which indicate the number of rows actually returned by the index 340 the most recent time that the query plan was executed.

If the determination at block 510 is true, then the DBMS 150 has found and selected a selected query plan from the cache 162 that implements the received query 158, so control continues to block 515 where the DBMS 150 determines whether the data 224, 234, 244 of the selected query plan is compressed. If the determination at block 515 is true, then the data of the selected query plan is compressed, so control continues to block 520 where the DBMS 150 decompresses the data of the selected query plan into the currently executing query plan 151. Control then continues to block 525 where the DBMS 150 executes the uncompressed query plan 151, finding rows specified by the currently executing (uncompressed) query plan 151, storing those rows to the result set 152, and returning the result set 152 to the application 160. Control then continues to block 530 where the DBMS 150 stores the query plan identifier, the query frequency, and the actual query runtime to the characterization data 380 and stores the statistics to the query plan 151.

Control then continues to block 535 where the DBMS 150 optionally compresses the query plan 151 into the query plan data 224, 234, or 244 and stores the query plan 205, 210, or 215 to the cache 162, as further described below with reference to FIG. 6. Control then returns to block 505 where the DBMS 150 receives the same or a different query 158 from the same or a different application 160, as previously described above.

If the determination at block 515 is false, then the query plan data of the selected query plan is uncompressed (e.g., the query plan data 244), so control continues to block 525, as previously described above, without decompressing the data of the selected query plan.

If the determination at block 510 is false, then the DBMS 150 did not find a query plan in the cache 162 that implements the received query 158, so control continues to block 540 where the DBMS 150 creates an uncompressed query plan, creates an estimated runtime for the query plan, and stores an identifier of the created query plan, the query frequency of the created query plan, and the estimated runtime for the created query plan to the characterization data 380. Control then continues to block 545 where the DBMS 150 optionally compresses the query plan data 224, 234, or 244 into the cache 162 based on the estimated runtime and creates and stores the metadata into the cache 162. If the estimated runtime of the query 158 is greater than a high time threshold, then the DBMS 150 compress the query plan data with a high compression level and stores the compressed data to the cache 162. If the estimated runtime of the query 158 is less than a low time threshold, then the DBMS 150 stores uncompressed query plan data to the cache 162. If the estimated runtime is less than or equal to the high time threshold and greater than or equal to the low time threshold, then the DBMS 150 compresses the query plan data with a medium compression level and stores the compressed query plan data to the cache 162. The high time threshold is a threshold time that is greater than the low time threshold. Control then continues to block 525, as previously described above.

Figure 6:
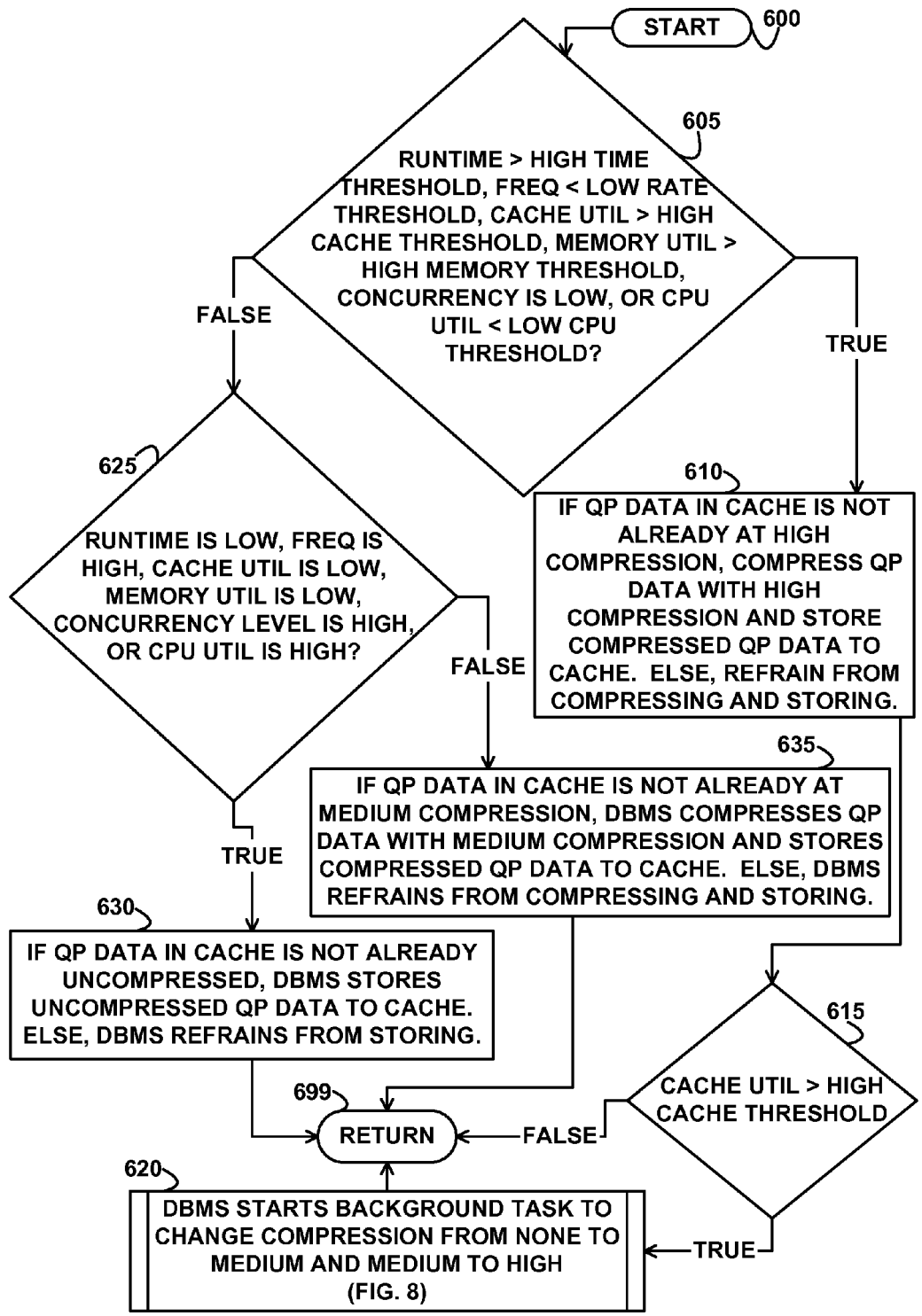
FIG. 6 depicts a flowchart of example processing for compressing query plans, according to an embodiment of the invention.

FIG. 6 depicts a flowchart of example processing for compressing query plans, according to an embodiment of the invention. Control begins at block 600. Control then continues to block 605 where the DBMS 150 determines whether the query runtime 414 of the selected query plan is greater than a high time threshold, the query frequency 412 of the selected query plan is less than a low rate threshold, the cache utilization 444 is greater than a high cache threshold, the memory utilization 446 is greater than a high memory threshold, the concurrency level 448 is less than a low concurrency level threshold, or the CPU utilization 440 is less than a low CPU threshold. The high time threshold is greater than a low time threshold. The low rate threshold is less than a high rate threshold. The high cache threshold is greater than a low cache threshold. The high memory threshold is greater than a low memory threshold. The low concurrency level threshold is less than a high concurrency level threshold. The low CPU threshold is less than a high CPU threshold.

If the determination at block 605 is true, then the query runtime 414 of the selected query plan is greater than the high time threshold, the query frequency 412 of the selected query plan is less than the low rate threshold, the cache utilization 444 is greater than the high cache threshold, the memory utilization 446 is greater than the high memory threshold, the concurrency level is less than the low concurrency level threshold, or the CPU utilization 440 is less than the low CPU threshold, so control continues to block 610 where, if the query plan data in the cache 162 is not already at a high compression level, the DBMS 150 compresses the query plan data with a high compression level and stores the compressed query plan data to the cache 162. If the query plan data in the cache 162 is already at a high compression level, the DBMS 150 refrains from compressing and storing the query plan data to the cache 162.

Control then continues to block 615 where the DBMS 150 determines whether the cache utilization 444 is greater than the high cache threshold. If the determination at block 615 is true, then the cache utilization 444 is greater than the high cache threshold, so control continues to block 620 where the DBMS 150 starts a background task, which changes the compression of the query plan data in the cache from uncompressed to a medium compression level and from a medium compression level to a high compression level, as further described below with reference to FIG. 8. Control then continues to block 699 where the logic of FIG. 6 returns.

If the determination at block 615 is false, then the cache utilization 444 is less than or equal to the high cache threshold, so control continues to block 699 without starting the background task.

If the determination of block 605 is false, then the query runtime 414 of the selected query plan is less than or equal to the high time threshold, the query frequency 412 of the selected query plan is greater than or equal to the low rate threshold, the cache utilization 444 is less than or equal to the high cache threshold, the memory utilization 446 is less than or equal to the high memory threshold, the concurrency level 448 is greater than or equal to the low concurrency level threshold, and the CPU utilization 440 is greater than or equal to the low CPU threshold, so control continues to block 625 where the DBMS 150 determines whether the query runtime 414 is less than a low time threshold, the query frequency 412 is greater than a high rate threshold, the cache utilization 444 is less than a low cache threshold, the memory utilization 446 is less than a low memory threshold, the concurrency level 448 is greater than a high currency threshold, or the CPU utilization 440 is greater than a high CPU utilization threshold.

If the determination at block 625 is true, then the query runtime 414 is less than the low time threshold, the query frequency 412 is greater than the high rate threshold, the cache utilization 444 is less than the low cache threshold, the memory utilization 446 is less than the low memory threshold, the concurrency level 448 is greater than the high currency threshold, or the CPU utilization 440 is greater than the high CPU utilization threshold, so control continues to block 630 where the DBMS 150, if the query plan data in the cache 162 is not already uncompressed, stores uncompressed query plan data to the cache 162. If the query plan data in the cache 162 is already uncompressed, then the DBMS 150 refrains from storing the query plan data to the cache 162. Control then continues to block 699 where the logic of FIG. 6 returns.

If the determination at block 625 is false, then the query runtime 414 is greater than or equal to the low time threshold and less than or equal to the high time threshold, the query frequency 412 is less than or equal to the high rate threshold and greater than or equal to the low rate threshold, the cache utilization 444 is greater than or equal to the low cache threshold and less than or equal to the high cache threshold, the memory utilization 446 is greater than or equal to the low memory threshold and less than or equal to the high memory threshold, the concurrency level 448 is less than or equal to the high currency threshold and greater than or equal to a low concurrency threshold, and the CPU utilization 440 is less than or equal to a high CPU utilization threshold and greater than or equal to the low CPU utilization threshold, so control continues to block 635 where, if the query plan data in the cache 162 is not already at a medium compression level, the DBMS 150 compresses the query plan data with a medium compression level and stores the compressed query plan data to the cache 162. If the query plan data in the cache 162 is already at a medium compression level, the DBMS 150 refrains from performing the compressing and the storing. Control then continues to block 699 where the logic of FIG. 6 returns.

In an embodiment, the memory utilization 446 is of interest because the DBMS 150, operating system, hypervisor, or other memory allocation manager dynamically adjusts the cache size downward, in order to free up more memory to be available to other processes if memory utilization is high.

Figure 7:
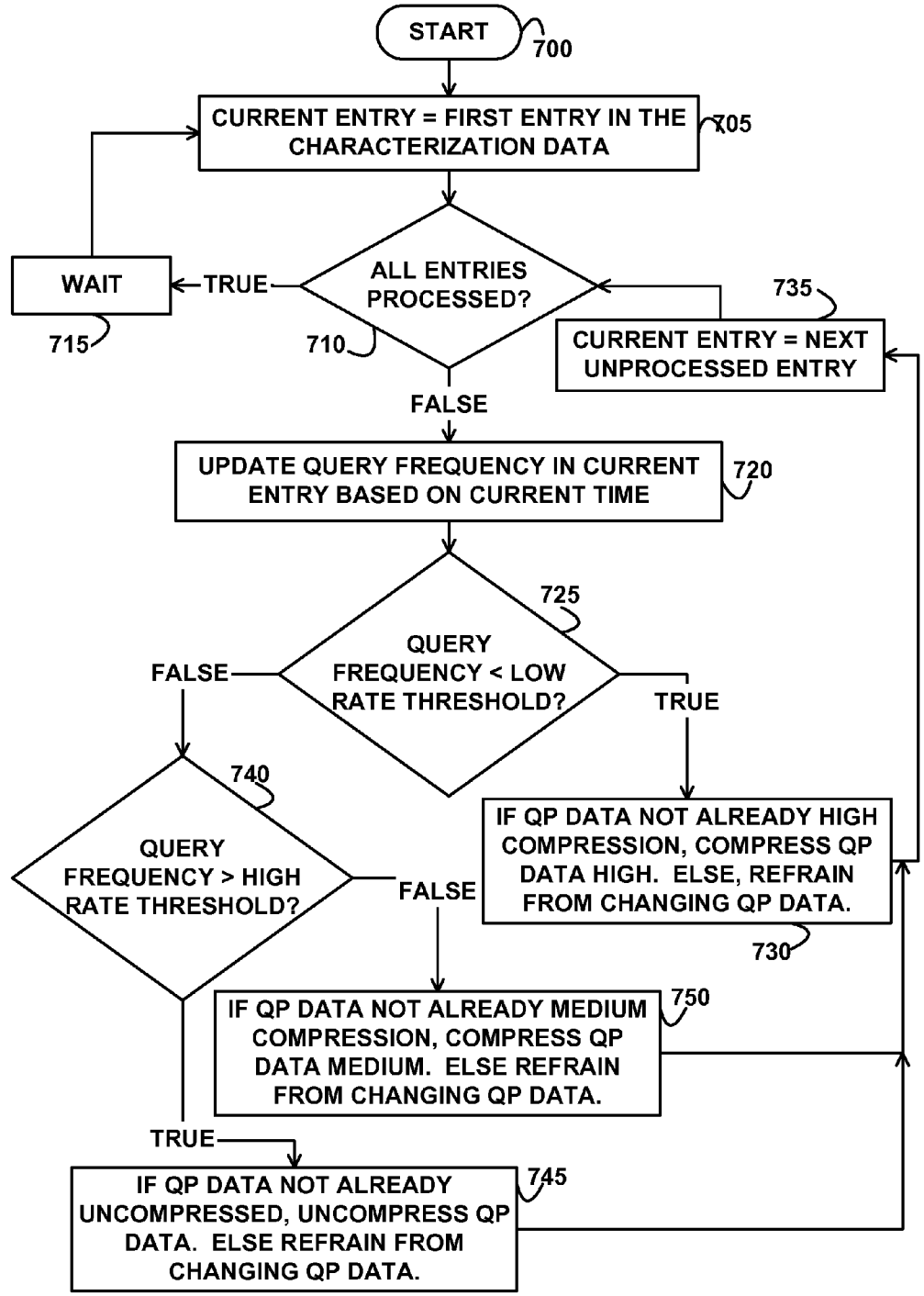
FIG. 7 depicts a flowchart of example processing for adjusting the compression level of query plans based on query frequency, according to an embodiment of the invention.

FIG. 7 depicts a flowchart of example processing for adjusting the compression level of query plans based on the frequency of the queries that the query plans implement, according to an embodiment of the invention. In an embodiment, FIG. 7 is implemented as a background task, thread, process, or program, which executes concurrently or simultaneously with the logic of FIG. 6, via multi-threading, multi-programming, multi-processing, or time-slicing techniques on the same or different processors.

Control begins at block 700. Control then continues to block 705 where the DBMS 150 sets the current entry to be the first entry in the characterization data 380. Control then continues to block 710 where the DBMS 150 determines whether all entries in the characterization data 380 have been processed or read by the loop that starts at block 710. If the determination at block 710 is true, then all entries in the characterization data 380 have been processed by the loop that starts at block 710, so control continues to block 715 where the logic of FIG. 7 waits for a period of time. Control then returns to block 705, as previously described above.

If the determination at block 710 is false, then not all entries in the characterization data 380 have been processed by the loop that starts at block 710, so control continues to block 720 where the DBMS 150 updates the query frequency 412 in the current entry of the characterization data 380 to reflect the current time. For example, the DBMS 150 calculates the difference between the current time and a starting time and divides the number of queries executed, since the starting time, via the query plan identified by the query plan identifier 410 in the current entry by the difference, and stores the result to the query frequency 412 in the current entry of the characterization data 380. In this way, the DBMS 150 periodically updates the query frequency 412.

Control then continues to block 725 where the DBMS 150 determines whether the query frequency 412, in the current entry of the characterization data 380, is less than a low rate threshold. If the determination at block 725 is true, then the query frequency 412 in the current entry of the characterization data 380 is less than a low rate threshold, so control continues to block 730 where, if the query plan data in the cache 162 is not already compressed at a high compression level, then the DBMS 150 compresses the query plan data in the cache 162 at a high compression level. If the query plan data is already compressed at a high compression level, then the DBMS 150 refrains from changing the compression level of the query plan data in the cache 162. Processing of the current entry in the characterization data 380 is now complete, so control continues to block 735 where the DBMS 150 sets the current entry to be the next unprocessed entry in the characterization data 380. Control then returns to block 710, as previously described above.

If the determination at block 725 is false, then the query frequency 412 in the current entry of the characterization data 380 is greater than or equal to the low rate threshold, so control continues to block 740 where the DBMS 150 determines whether the query frequency 412 is greater than the high rate threshold.

If the determination at block 740 is true, then the query frequency 412 is greater than the high rate threshold, so control continues to block 745 where, if the query plan data is not already at an uncompressed level, then the DBMS 150 decompresses the query plan data in the cache 162 and stores the uncompressed query plan data to the cache 162. If the query plan data is already uncompressed, then the DBMS 150 refrains from changing the compression level of the query plan data in the cache 162. Processing of the current entry in the characterization data 380 is now complete, so control continues to block 735 where the DBMS 150 sets the current entry to be the next unprocessed entry in the characterization data 380. Control then returns to block 710, as previously described above.

If the determination at block 740 is false, then the query frequency 412 is less than or equal to the high rate threshold and greater than or equal to the low rate threshold, so control continues to block 750 where, if the query plan data is not already compressed at a medium compression level, the DBMS 150 compresses the query plan data in the cache 162 at a medium compression level and stores the query plan data with the medium compression level to the cache 162. If the query plan data is already compressed at a medium compression level, the DBMS 150 refrains from changing the compression level of the query plan data in the cache 162. Processing of the current entry in the characterization data 380 is now complete, so control continues to block 735 where the DBMS 150 sets the current entry to be the next unprocessed entry in the characterization data 380. Control then returns to block 710, as previously described above.

Figure 8:
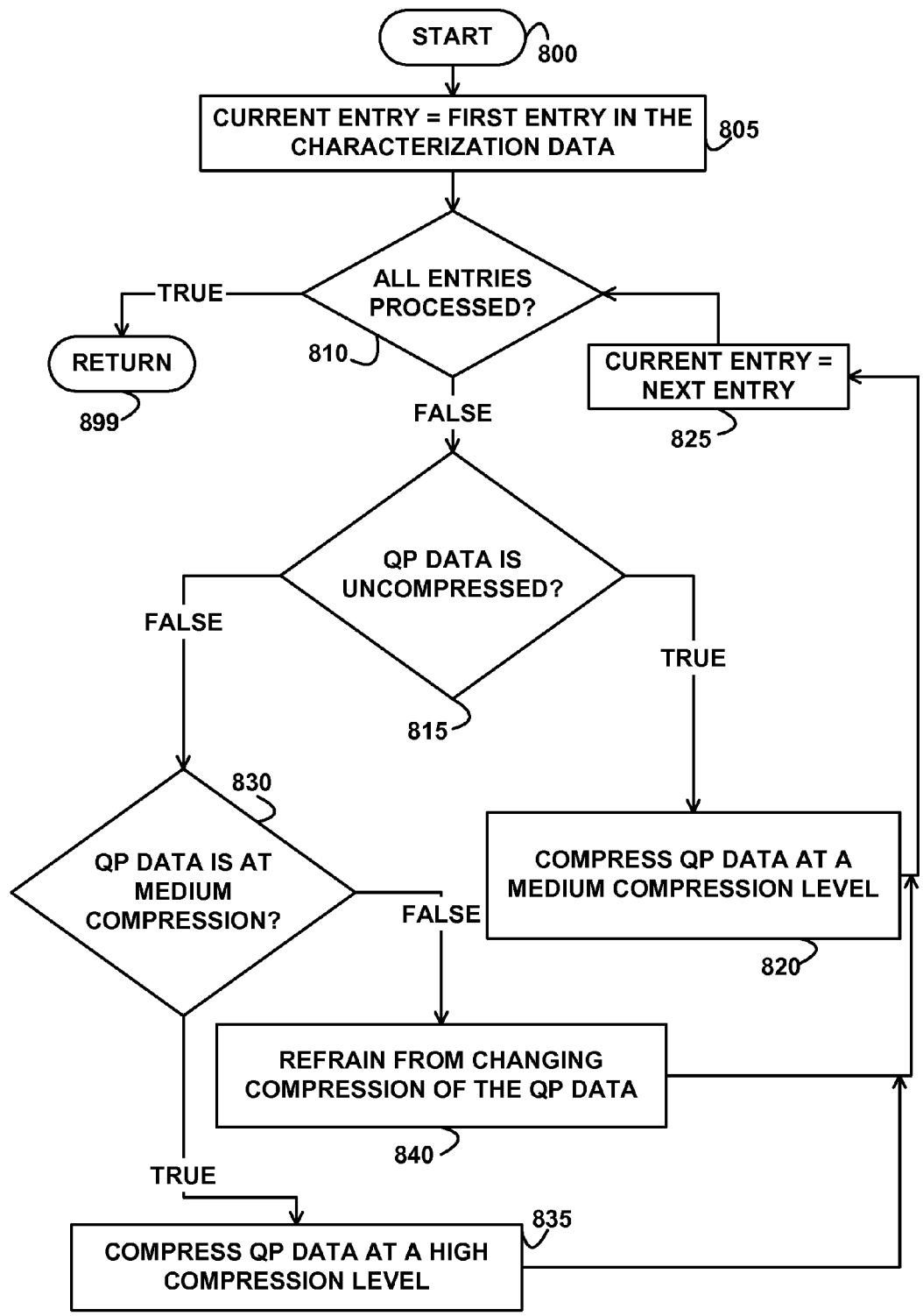
FIG. 8 depicts a flowchart of example processing for increasing the compression level of query plans, according to an embodiment of the invention.

FIG. 8 depicts a flowchart of example processing for increasing the compression level of query plans, according to an embodiment of the invention. Control begins at block 800. Control then continues to block 805 where the DBMS 150 sets the current entry to be the first entry in the characterization data 380. Control then continues to block 810 where the DBMS 150 determines whether all entries in the characterization data 380 have been processed or read by the loop that starts at block 810. If the determination at block 810 is true, then all entries in the characterization data 380 have been processed by the loop that starts at block 810, so control continues to block 899 where the logic of FIG. 8 returns.

If the determination at block 810 is false, then not all entries in the characterization data have been processed by the loop that starts at block 810, so control continues to block 815 where the DBMS 150 determines whether the query plan data for the current entry is uncompressed. If the determination at block 815 is true, then the query plan data for the current entry is uncompressed, so control continues to block 820 where the DBMS 150 compresses the query plan data at a medium compression level and stores the data with the medium compression level (e.g., the query plan data 234) to the cache 162. Thus, the DBMS 150 changes the compression level of the query plan data from uncompressed to a medium compression level. Processing of the current entry is now complete, so control continues to block 825 where the DBMS 150 sets the current entry to be the next unprocessed entry in the characterization data 380. Control then returns to block 810, as previously described above.

If the determination at block 815 is false, then the query plan data is not uncompressed, so control continues to block 830 where the DBMS 150 determines whether the query plan data of the query plan identified by the current entry in the characterization data 380 is compressed at a medium compression level. If the determination at block 830 is true, then the query plan data of the query plan identified by the current entry in the characterization data 380 is compressed at a medium compression level, so control continues to block 835 where the DBMS 150 compresses the query plan data at a high compression level and stores the query plan data with the high compression level (e.g., the query plan data 224) to the cache 162. Thus, the DBMS 150 changes the compression level of the query plan data from a medium compression level to a high compression level. Processing of the current entry is now complete, so control continues to block 825 where the DBMS 150 sets the current entry to be the next unprocessed entry in the characterization data 380. Control then returns to block 810, as previously described above.

If the determination at block 830 is false, then the query plan data is at a high compression level, so control continues to block 840 where the DBMS 150 refrains from changing the compression of the query plan data since the query plan data is already at a high compression level. Processing of the current entry is now complete, so control continues to block 825 where the DBMS 150 sets the current entry to be the next unprocessed entry in the characterization data. Control then returns to block 810, as previously described above.

Thus, since increasing compression levels of query plans consume decreasing amounts of storage, but require increasing amounts of processing power to perform compression and decompression, an embodiment of the invention provides a balance of the competing attributes of storage requirements and processing power.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A computer-implemented method, comprising:
generating a plurality of query plans, each plan for executing a respective query against data in a database;
with respect to each query plan of said plurality of query plans, selectively determining whether the respective query plan should be stored to data in a cache in a compressed form;
with respect to each query plan of said plurality of query plans for which it is selectively determined that the respective query plan should be stored to data in a cache in a compressed form, storing the query plan to data in the cache in a compressed form; and
with respect to each query plan of said plurality of query plans for which it is selectively determined that the respective query plan should not be stored to data in a cache in a compressed form, storing the query plan to data in the cache in an uncompressed form;
wherein said selectively determining whether the respective query plan should be stored to data in a cache in a compressed form comprises determining whether at least one parameter of characterization data exceeds at least one threshold.

2. The computer-implemented method of claim 1, wherein the compressed form of the query plan data is produced by a lossless compression algorithm which is one of: a Lempel-Ziv (LZ) compression algorithm, a DEFLATE compression algorithm, or an LZR (LZ-Renau) compression algorithm.

3. A non-transitory computer-readable storage medium encoded with instructions, wherein the instructions when executed comprise:
generating a plurality of query plans, each plan for executing a respective query against data in a database;
with respect to each query plan of said plurality of query plans, selectively determining whether the respective query plan should be stored to data in a cache in a compressed form;
with respect to each query plan of said plurality of query plans for which it is selectively determined that the respective query plan should be stored to data in a cache in a compressed form, storing the query plan to data in the cache in a compressed form; and
with respect to each query plan of said plurality of query plans for which it is selectively determined that the respective query plan should not be stored to data in a cache in a compressed form, storing the query plan to data in the cache in an uncompressed form;
wherein the compressed form of the query plan data is produced by a lossless compression algorithm which is one of: a Lempel-Ziv (LZ) compression algorithm, a DEFLATE compression algorithm, or an LZR (LZ-Renau) compression algorithm.

4. The non-transitory computer-readable storage medium of claim 3, wherein said selectively determining whether the respective query plan should be stored to data in a cache in a compressed form comprises determining whether at least one parameter of characterization data exceeds at least one threshold.

5. A computer system comprising:
a memory;
at least one processor communicatively connected to said memory, the at least one processor executing instructions storable in said memory;
at least one query plan cache storable in said memory;
processor-executable instructions storable in said memory for maintaining said at least one query plan cache, wherein when executed the processor-executable instructions perform:
with respect to each query plan of a plurality of query plans for executing respective queries against data in a database, selectively determining whether the respective query plan should be stored to data in a cache in a compressed form;
with respect to each query plan of said plurality of query plans for which it is selectively determined that the respective query plan should be stored to data in a cache in a compressed form, storing the query plan to data in the cache in a compressed form; and
with respect to each query plan of said plurality of query plans for which it is selectively determined that the respective query plan should not be stored to data in a cache in a compressed form, storing the query plan to data in the cache in an uncompressed form;
wherein said selectively determining whether the respective query plan should be stored to data in a cache in a compressed form comprises determining whether at least one parameter of characterization data exceeds at least one threshold.

6. The computer system of claim 5, further comprising a database management system (DBMS) embodied as processor-executable instructions storable in said memory, wherein said processor-executable instructions for maintaining said at least one query plan cache are included in said DBMS.

7. The computer system of claim 5, wherein the compressed form of the query plan data is produced by a lossless compression algorithm which is one of: a Lempel-Ziv (LZ) compression algorithm, a DEFLATE compression algorithm, or an LZR (LZ-Renau) compression algorithm.

* * * * *